April 1, 1969    R. R. HANSON    3,436,101
LUBRICATING HITCH BALL DEVICE
Filed May 4, 1967

INVENTOR
ROY R. HANSON
BY
ATTORNEY

United States Patent Office 3,436,101
Patented Apr. 1, 1969

3,436,101
LUBRICATING HITCH BALL DEVICE
Roy R. Hanson, 155 Cumberland,
Maryland Heights, Mo. 63042
Filed May 4, 1967, Ser. No. 636,132
Int. Cl. B60d 1/06, 53/04; F16c 11/06
U.S. Cl. 280—511                    8 Claims

ABSTRACT OF THE DISCLOSURE

A hitch ball for use in towing vehicular trailers and including a canted hemisphere on which a hemispherical cap is mounted for rotation thereon. Internally, the canted hemisphere and cap are provided with a common grease reservoir from which grease exudes across the surfaces forming the juncture of the canted hemisphere and rotatable cap. The grease so exuded finds its way across the hemispherical surfaces through the wiping action of a mating coupler member forming part of the trailer tongue. A pair of spring bars are pivotally attached to the hitch ball mount for swinging movement in a horizontal plane and at their opposite ends are drawn up toward the trailer tongue by means of chains so as to more evenly distribute the tongue weight of the trailer between the front and rear axles and the automobile.

---

Modern automobiles, light trucks, and tractors are commonly coupled to trailers by means of ball-and-socket joints, the ball being rigidly mounted at the rear of the automobile, truck, or tractor, and the socket forming the forward terminal end of the trailer tongue. In recent years the demand for larger and heavier trailers has increased, especially in the case of mobile homes and power boat trailers, and as a result conventional hitch balls are being called upon to support tongue weights of extremely large magnitudes. In contrast to trailers of light tongue weights where lubrication of their ball-and-socket joints is not critical and in fact is omitted in many cases altogether, the mating surfaces of the ball-and-socket hitches or joints for trailers of heavy tongue weight must be constantly lubricated or they will wear rapidly through the effects of friction and road grime and thereby become unserviceable within a short time. The development of weight equalizing hitches for use with heavy trailers has compounded this problem. These hitches, in addition to a conventional hitch ball, basically comprise a pair of spring bars which are pivotally secured at one end to the car frame adjacent the hitch ball for horizontal swinging movement. The opposite ends of the spring bars are fastened to the trailer frame members rearwardly of the ball-receiving socket member by means of chains. When the chains are drawn taut, the rear of the car is raised, just as if someone grasped the rear bumper and lifted upwardly, thereby leveling the automobile and distributing the tongue weight of the trailer more equally between the automobile's front and rear axles. The forces required to distort the spring bars and level the automobile, however, increase the equal and opposite forces at the ball-and-socket joint in an amount generally fifty percent greater than the tongue weight of the trailer. Consequently, the mating surfaces of the hitch ball and socket member generate heat more quickly, dissipate grease and other lubrication quite rapidly, and become unserviceable within a much shorter period of time. In the case of travel trailers it is not uncommon for these ball-and-socket joints forming part of weight-equalizing hitches to incur considerable and excessive wear.

Among the several objects of the present invention may be noted the provision of a trailer hitch suitable for use with trailers having heavy tongue loads; the provision of a trailer hitch which continuously lubricates the mating surfaces of the hitch ball and socket member; and the provision of a trailer hitch which is simple yet durable in construction and easy to manufacture. Other objects and features will be in part apparent and in part pointed out hereinafter.

The invention accordingly comprises the constructions hereinafter described, the scope of the invention being indicated in the following claims.

Figure 1:
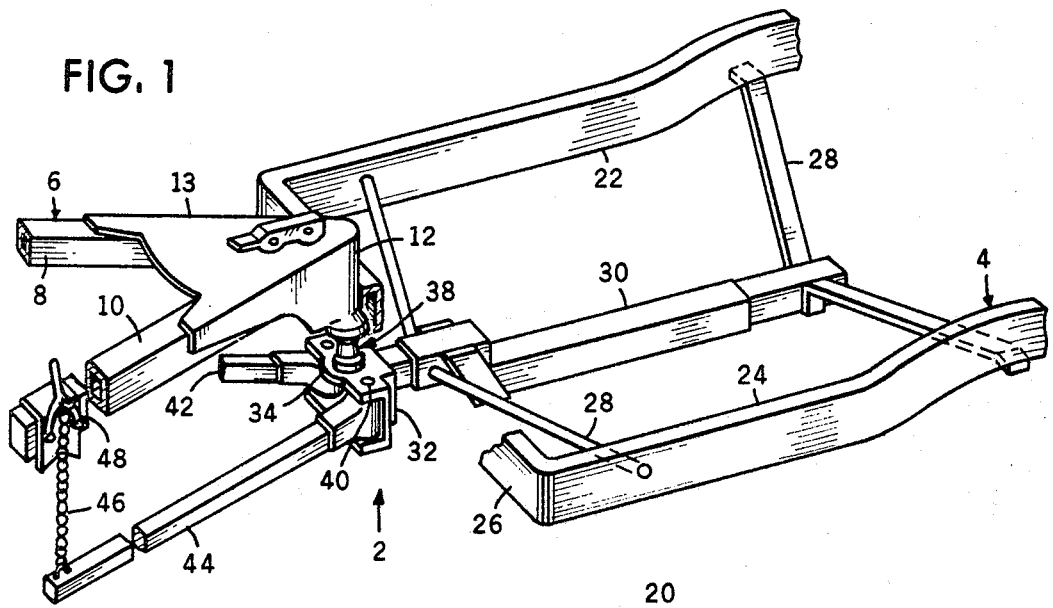
Figure 2:
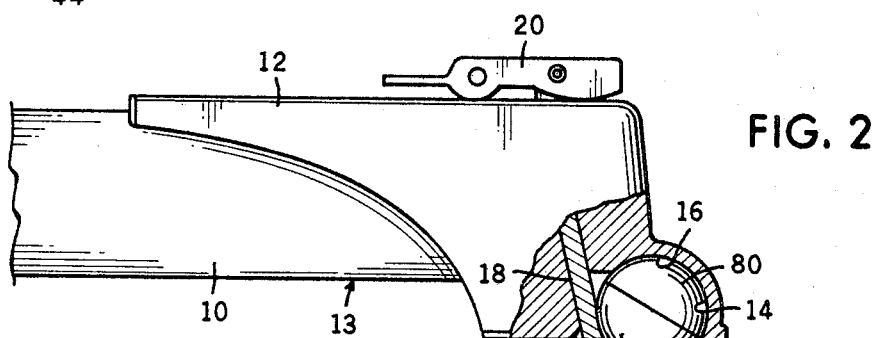
Figure 3:
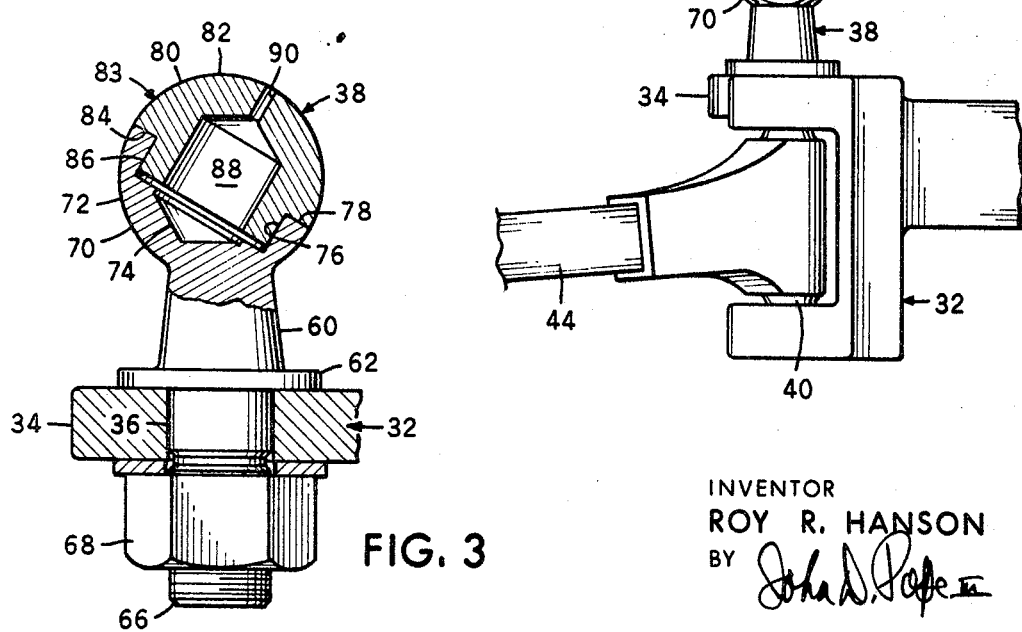

In the accompanying drawings, in which one of various possible embodiments of the invention is illustrated, FIG. 1 is a perspective view of a hitch assembly constructed in accordance with and embodying the present invention;

FIG. 2 is a fragmentary elevational view, partially broken away and in section, of the hitch assembly; and FIG. 3 is an elevational view, partially broken away and in section, of a hitch ball forming part of the present invention.

Corresponding reference characters indicate corresponding parts throughout the several views of the drawings.

Referring now to the drawings, 2 designates a hitch assembly for coupling an automobile, tractor, or light truck 4 with a trailer 6, the latter having two forwardly converging A-frame members 8, 10, which at their forward ends are welded to and interconnected by a conventional socket member 12 in the formation of a trailer tongue 13. Socket member 12 includes a downwardly opening socket 14 having a substantially spherical surface 16 defined in part by a slidable lock bar 18 which is connected to and actuated by a locking lever 20, all of which are conventional and, therefore, not described in further detail.

Automobile 4 includes two longitudinally extending frame members 22, 24, and a rear cross member 26, all of which are conventional to automobiles of current manufacture. Located intermediate longitudinal frame members 22, 24, and rigidly secured thereto by brackets 28, as well as to cross member 26, is a tow bar 30. Fitted on the rear end of tow bar 30 is a ball mount 32 having a rearwardly projecting upper flange 34 centrally provided with an aperture 36 into which a hitch ball 38 is fitted. Socket 14 receives hitch ball 38 and in this manner trailer 6 is coupled to automobile 4. Pivotally secured to ball mount 32 by means of a pair of vertical pins 40 located on each side of hitch ball 38 are a pair of rearwardly projecting spring bars 42, 44, which are free for swinging movement about axes perpendicular to the road surface. The extreme rear ends of spring bars 42, 44, are fitted with connecting chains 46 which are releasably engaged by over-center clamps 48 carried by A-frame members 8, 10, in rearwardly spaced relation to socket member 12. Clamps 48 draw the rear ends of spring bars 42, 44, toward A-frame members 8, 10, and the moments generated by the distortion of spring bars 42, 44, lift the rear end of automobile 4 so as to more evenly distribute the tongue weight of trailer 6 between the front and rear axles thereof. This not only alleviates the necessity of overload springs on automobile 4, but further levels its frame and body and affords the driver far better control.

Turning now to FIGS. 2 and 3, hitch ball 38 includes a pedestal portion 60 having a downwardly presented diametrically enlarged flange 62 which rests on the upper surface of rearwardly projecting flange 34 forming part of ball mount 32. Formed integral with and projecting axially from pedestal 60 is a threaded shank 66 which extends through aperture 36 beyond which it is fitted with a nut 68 for securing hitch ball 38 firmly to ball mount 32. At its upper end pedestal 60 integrally merges into a canted ball segment or hemisphere 70 having an outwardly presented hemispherical surface 72. Interiorly, hemisphere 70 is provided with an upwardly opening grease well 74, the sides of which are defined in part by an inwardly presented cylindrical face 76. Hemisphere 70 upwardly terminates at an annular planar bearing surface 78. It should be noted that the axis of canted hemisphere 70 intersects the common axis of pedestal 60 and threaded shank 66 at the plane defined by annular bearing surface 78 and furthermore is rearwardly angulated with respect thereto at an angle of approximately 30°.

Rotatably mounted on canted hemisphere 70 is a hemispherical cap 80 having a hemispherical outwardly presented surface 82 which coincides with and forms a continuation of surface 72, thereby forming a ball 83 sized for insertion in and retention by socket 14. Hemispherical surface 82 downwardly terminates at a shoulder-forming annular bearing surface 84 which rides upon bearing surface 78. Projecting axially from bearing surface 84 is a diametrally reduced cylindrical boss 86 which fits snugly but rotatably within the portion of grease well 74 defined by cylindrical face 76. Accordingly, cap 80 is free to rotate on canted hemisphere 70, but lateral displacement thereof is precluded by the disposition of cylindrical boss 86 within grease well 74. Interiorly cap 80 is provided with a downwardly opening axially extending grease cavity 88 which communicates at its one end with surface 82 through an axially extending vent 90.

In use, grease well 74 and grease cavity 88 are filled with a suitable grease and, preferably, the same grease is smeared over hemispherical surfaces 72, 82. Thereafter, lock bar 18 is withdrawn by lifting locking lever 20 and tongue 13 is maneuvered until socket 14 aligns with and receives ball 83 of hitch ball 38. Thereafter lock bar 18 is brought into locking engagement with ball 83 by depressing locking lever 20 so that ball 83 is free to rotate with respect to socket member 12, but cannot be withdrawn therefrom. Subsequently, connecting chains 46 are hooked onto over-center clamps 48 and the latter are moved into their locked position so that spring bars 42, 44, are drawn toward A-frame members 8, 10, thereby lifting the rear of automobile 4. This increases the magnitude of the force exerted on ball 83 by socket member 12.

When trailer 6 is towed by automobile 4, combined surfaces 72, 82, of ball 83 on one hand and their mating surface 16 of socket member 12 on the other will receive continuous lubrication which reduces friction and eliminates the high degree of wear so often associated with conventional hitch balls. As automobile 4 negotiates a turn, cap 80 will rotate with respect to stationary canted hemisphere 70 and in so doing a small amount of grease will exude from grease well 74 along abutting bearing surfaces 78, 84. This grease finds its way onto surfaces 72, 82, and 16 and is worked across such surfaces by the relative movement therebetween. It should be noted that the primarily relative movement is generated by movement of trailer 6 in a horizontal plane with respect to automobile 4. Inasmuch as bearing surfaces 78, 84, are disposed at an angle with respect to the horizontal plane of turning, the grease so exuded will be initially carried onto spherical surface 16 along a line coincident to the outer margin of annular bearing surface 78. This same grease, however, will be carried onto hemispherical surface 82 of cap 80 and, through the turning motion of trailer 6, cap 80 will rotate with respect to canted hemisphere 70. However, because of its angular disposition with respect to the axis of turning, cap 80 will not experience the same degree of rotation with respect to canted hemisphere 70 as does socket member 12. Surface 82 will move relative to spherical surface 16 of socket 14, and as a result the grease initially exuded along the thin line coincident to the outer margin of canted hemisphere 70 will eventually find its way entirely across surfaces 82 and 16 as well as across the portion of surface 72 in engagement with the latter. The normally slight lateral and longitudinal tilting movement of trailer 6 with respect to automobile 4 caused by irregularities in the road surface will further tend to distribute the grease from grease well 74 across mating surfaces 82, 72, and 16.

It should be noted that hitch ball 38 is ideally suited for use in conjunction with weight-equalizing devices such as illustrated and has been experimentally tested with such weight-equalizing devices. These tests revealed that surfaces 72, 82, and 16 remained well lubricated even after a 2,000 mile trip during which no grease was externally applied to such surfaces or added to grease well 74 or grease cavity 88. Hitch ball 38 is similarly suited for use with conventional trailer hitches not employing weight-equalizing devices.

In view of the above, it will be seen that the several objects of the invention are achieved and other advantageous results attained.

What is claimed is:

1. A hitch ball for coupling a prime mover with a trailer provided with a tongue having a downwardly opening substantially spherical socket; said hitch ball comprising a pedestal rigidly mounted at the rear of the prime mover and projecting upwardly therefrom, a ball segment mounted rigidly on the pedestal, a cap mounted on the ball segment for rotation about an axis which is canted at an acute angle with respect to the vertical axis of the ball segment, and a grease well in the ball segment in communication with the abutting bearing surfaces of the ball segment and cap.

2. A hitch ball according to claim 1 wherein the outwardly presented surfaces of the ball segment and cap align and in combination form a substantially spherical surface which conforms to the spherical surface of the socket.

3. A hitch ball according to claim 2 in which the axis of rotation projects downwardly and rearwardly from the cap.

4. A hitch ball according to claim 3 wherein the grease well is defined in part by a cylindrical recess and the cap is provided with a cylindrical boss which fits rotatively within the recess whereby to preclude lateral displacement of the cap on the ball segment.

5. A hitch ball according to claim 4 wherein the ball segment is provided in surrounding relation to the grease well with a first annular bearing surface and the cap is provided in surrounding relation to the cylindrical boss with a second bearing surface which engages and rides upon the first bearing surface whereby to provide surfaces across which the grease from the grease well can pass so as to ultimately lubricate the outwardly presented spherical surface formed by the ball segment and cap.

6. A hitch ball according to claim 5 wherein the ball segment and cap are substantially hemispherical.

7. A vehicular hitch assembly for coupling a prime mover such as an automobile, truck or tractor with a trailer provided with a tongue having a downwardly opening substantially spherical socket and locking means for optionally enlarging the socket; said hitch assembly comprising a ball mount rigidly mounted at the rear end of the prime mover, a pedestal affixed firmly to the ball mount and projecting upwardly therefrom, a ball segment mounted rigidly on the pedestal, a cap mounted on the ball segment for rotation about an axis which is canted at an acute angle with respect to a line substantially perpendicular to the road surface over which the prime mover and trailer pass, the axis of rotation extending downwardly and rearwardly from the cap, the outwardly presented surfaces of the ball segment and cap being in alignment and in combination forming a substantially spherical surface which fits within and conforms with the spherical surface of the socket, whereby the trailer is pivotally coupled with the prime mover, means for preventing lateral displacement of the cap on the ball segment, resilient spring bars journaled to the ball mount adjacent the pedestal for swinging movement about axes substantially perpendicular to the road surface, and connecting means interconnecting the trailer tongue in rearwardly spaced relation to the spherical socket and the spring arms in spaced relation to their axes of rotation, the connecting means being adapted to hold the spring bars in a distorted configuration whereby the tongue load of the trailer is distributed across the various axles of the prime mover.

8. A hitch assembly according to claim 7 wherein the ball segment and cap are substantially hemispherical; wherein the ball segment and cap are provided with mating bearing surfaces; and wherein the ball segment is provided with a grease well which exudes its grease across the bearing surfaces to the outer hemispherical surfaces of the ball and the hemispherical surface of the socket.

References Cited

UNITED STATES PATENTS

| | | | |
|---|---|---|---|
| 1,889,297 | 11/1932 | Russell | 280—511 |
| 2,053,583 | 9/1936 | Summers. | |
| 2,857,190 | 10/1958 | Moskovitz | 287—87 |
| 2,934,366 | 4/1960 | Moskovitz. | |
| 2,998,262 | 8/1961 | Hoffman. | |
| 3,184,254 | 5/1965 | Seeley | 280—513 |

FOREIGN PATENTS 1,054,524 10/1953 France.

LEO FRIAGLIA, *Primary Examiner.*

U.S. Cl. X.R.

280—406; 285—94; 287—87; 308—72